(12) United States Patent
Filipczak et al.

(10) Patent No.: US 7,784,851 B2
(45) Date of Patent: Aug. 31, 2010

(54) PASSIVE WATER MANAGEMENT TROUGH FOR A VEHICLE DOOR AND METHOD

(75) Inventors: Larry A. Filipczak, West Bloomfield, MI (US); Brian R. Rusch, Sterling Heights, MI (US); Luigi R. Magnanti, Hartland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 371 days.

(21) Appl. No.: 11/748,067

(22) Filed: May 14, 2007

(65) Prior Publication Data

US 2008/0284202 A1   Nov. 20, 2008

(51) Int. Cl.
*B60J 10/08* (2006.01)
(52) U.S. Cl. ................... 296/146.1; 49/502
(58) Field of Classification Search .......... 296/154, 296/146.9, 213; 49/502
See application file for complete search history.

(56) References Cited

U.S. PATENT DOCUMENTS

| | | | | |
|---|---|---|---|---|
| 2,821,429 | A * | 1/1958 | Rantala | 296/208 |
| 4,445,721 | A * | 5/1984 | Yaotani et al. | 296/154 |
| 4,962,601 | A * | 10/1990 | Gold | 49/374 |
| 5,322,722 | A * | 6/1994 | Rozenberg | 428/40.1 |
| 5,482,343 | A * | 1/1996 | Bradac | 296/39.1 |
| 6,612,641 | B2 * | 9/2003 | Schutt et al. | 296/152 |
| 6,631,940 | B2 * | 10/2003 | Dauvergne et al. | 296/146.6 |
| 7,066,527 | B2 * | 6/2006 | Kohara et al. | 296/146.7 |

FOREIGN PATENT DOCUMENTS

| | | |
|---|---|---|
| CN | 1594817 A | 3/2005 |
| DE | 3600745 A1 | 7/1986 |
| DE | 3630405 C2 | 6/1990 |
| DE | 9210663 U1 | 12/1992 |
| DE | 10313706 A1 | 10/2004 |
| GB | 2188564 A * | 10/1987 |

OTHER PUBLICATIONS

The English translations of Manfored (DE 10313706 A1).*

* cited by examiner

*Primary Examiner*—Patricia L Engle
*Assistant Examiner*—SunSurraye Westbrook
(74) *Attorney, Agent, or Firm*—Quinn Law Group, PLLC (57) ABSTRACT

The apparatus of the present invention provides a passive water management system for vehicle doors. One or more water management troughs are formed into the inner door panel of the vehicle door at least partially encircling one or more holes or opening through the inner door panel. Strips of adhesive material are provided proximate to and extending along each side of the water management trough. A water deflector sheet of water shedding material is secured to the inner door panel by the adhesive strips, such that the strips, water management trough and deflector sheet form a conduit for routing water to drain holes draining into the door cavity thereby preventing water incursion through the inner door panel openings from reaching the vehicle interior. A method of managing water seeping into a vehicle door is also disclosed.

20 Claims, 6 Drawing Sheets

PASSIVE WATER MANAGEMENT TROUGH FOR A VEHICLE DOOR AND METHOD

TECHNICAL FIELD

The present invention relates to vehicle doors and water deflector sheets for inner door panels and, more particularly, to a passive water management trough for a vehicle inner door panel.

BACKGROUND OF THE INVENTION

Vehicle doors typically have an exterior panel and an inner panel that are secured together in a facing relationship and form a door cavity therebetween. The exterior and inner door panels are typically produced from a stamped and formed steel sheet although other materials such as fiberglass and aluminum are also used in the art. The inner door panel of a vehicle door is typically provided with one or more openings or holes for mounting certain accessories and mechanisms into the door and for providing access to the door inner cavity for installation and repair of door mounted accessories and mechanisms.

Examples of accessories and mechanisms installed into a vehicle door may include without limitation, audio speakers, electric door locks, window operating mechanisms, door locking mechanisms, remote side mirror controls and other accessories and mechanisms as may be provided on a vehicle. Vehicle door inner door panels are typically standardized to support a variety of production vehicle configurations, and therefore inner door panels are typically provided with holes and openings to accommodate mounting and access requirements of all planned and otherwise intended accessories and mechanisms, many of which may not be provided in a specific vehicle therefore leaving these unused holes and opening unfilled. In a vehicle door, an inner trim panel is typically secured over the inner door panel to close out the inner door panel and provide an aesthetically decorative inner door surface that faces into the passenger compartment.

It is commonplace for a portion of the water impinging upon a vehicle door to find its way into the door cavity behind the door inner panel. Water may enter the door cavity through any of several means, one means of water entry into the door cavity being water impinging upon and running down the door glazing (generally a transparent tempered or laminated glass window) mounted in the vehicle door. Water running down the window may find its way into the door cavity. It is typical practice of automotive manufacturers to provide a water deflector for closing out the holes and openings in the inner door panel and thereby preventing water in the door cavity from entering the interior of the vehicle or gaining access to the door inner trim panel. In automotive practice, water deflectors are typically a sheet of a water shedding material having a peripheral shape that is selected to cover the openings and holes in the door inner panel and to mate about its periphery with the inner door panel to which it is secured in some fashion. The bottom portion of the door cavity is typically provided with one or more drain holes to permit water that gathers in the door cavity to drain from the door cavity to the exterior of the vehicle, preventing water accumulation in the door cavity.

SUMMARY OF THE INVENTION

The present invention provides a passive water management system for vehicle doors that works in cooperation with the water deflector. One or more water management troughs are formed into the inner door panel of the vehicle door sufficiently outboard of or at least partially encircling a group of one or more holes or openings provided through the thus perforated inner door panel as discussed above. For each water management trough, a strip of adhesive material is provided proximate to and extending along each side of the water management trough. A water deflector sheet of water shedding material is secured to the inner door panel by these adhesive strips extending along the length of the water management trough. Adhesively securing the water deflector sheet to cover the water management trough defines a water routing conduit on the inner door panel that is operative to guide water that may seep through the adhesive sealing zones to one or more drain holes in the inner door panel, thereby preventing water seepage through the adhesive strips between the inner door panel and the water deflector sheet from defeating the water deflector and entering the vehicle interior.

According to one aspect of the invention, the vehicle door has an exterior door panel, an inner door panel secured to the exterior door panel and a door cavity there between.

According to another aspect of the invention, the water management trough extends in the inner door panel along the bottom edge of the water deflector and a least partially up the opposing sides of the area covered by the water deflector.

According to another aspect of the invention, the water management trough extends in the inner door panel along the bottom edge of the water deflector and up the opposing sides of the area covered by the water deflector.

According to another aspect of the invention, the water management trough extends in the inner door panel along the bottom edge of the water deflector and up the opposing sides of the area covered by the water deflector and further extends at least partially across the top portion of the area in the inner door panel covered by the water deflector.

According to another aspect of the invention, the water management trough is outboard of and/or fully encircles the group of openings in the inner door panel.

According to another aspect of the invention, a vehicle door may be provided with a plurality of water management troughs and a plurality of water deflector sheets. Each water deflector is formed from a sheet of water shedding material. Each water deflector has an attachment surface sized and configured to overlay and cover at least a portion of at least one water management trough or troughs including a portion of the primary sealing zone and a portion of the secondary sealing zone. The attachment surface of each water deflector is adhesively secured to the inner door panel surface and sealably covers at least a portion of at least one water management trough.

According to another aspect of the invention, the adhesive strips are applied in two beads of adhesive, each bead applied proximate to opposing side boundaries of the water management trough.

According to another aspect of the invention, the adhesive strips are applied as two individual beads of adhesive, each bead having a width selected to form the adhesive strips provided proximate to and extending along opposing sides of the water management trough.

According to another aspect of the invention, the width of the adhesive strip bordering the outboard boundary or second boundary of the water management trough has a width selected to extend beyond the area on the inner door panel covered by the water deflector sheet, the width extended to allow for misalignment of the water deflector sheet during installation onto the inner door panel.

According to another aspect of the invention, the water deflector sheet is made from a sheet of polyethylene, polypropylene, filled polyethylene or modified polypropylene.

According to another aspect of the invention, a method is disclosed for passively managing water seeping into vehicle door having a perforated inner door panel. The method includes the steps of forming a trough in an inner door panel at a position sufficiently outboard of the perforation or perforations to receive the water seepage. Then covering the trough and the perforation in the inner door panel with a water shedding sheet. The water shedding sheet is then sealed to the inner door panel along both sides of the trough in a manner to sufficiently seal one side of the trough so that water received through the perforations will flow towards the trough while sufficiently sealing the other side of the trough so that water flowing toward the trough is collected in the trough. A sufficient drain is then formed in the trough or in the seal in the outermost side of the trough so that water collected in the trough will drain.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
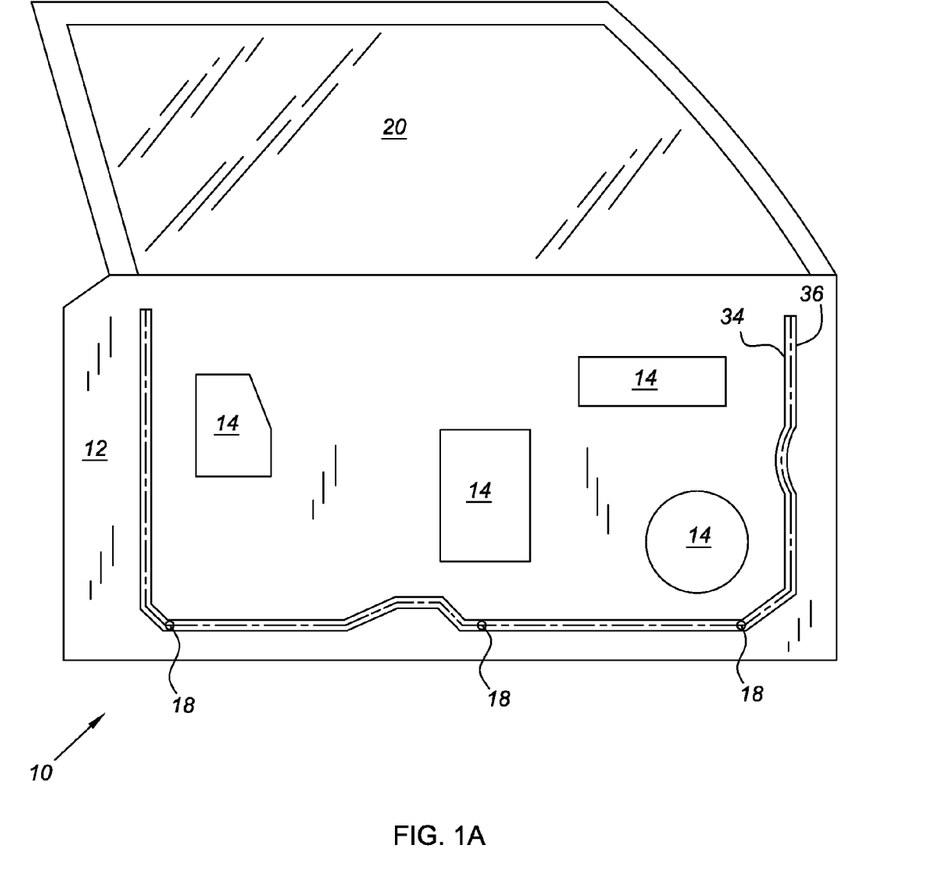
FIG. 1A illustrates a front view of the interior side of a vehicle door showing the inner door panel having several openings through the inner panel, and a water management trough formed into the inner door panel with water drain holes positioned at low points on the water management trough consistent with the present invention.
Figure 2:
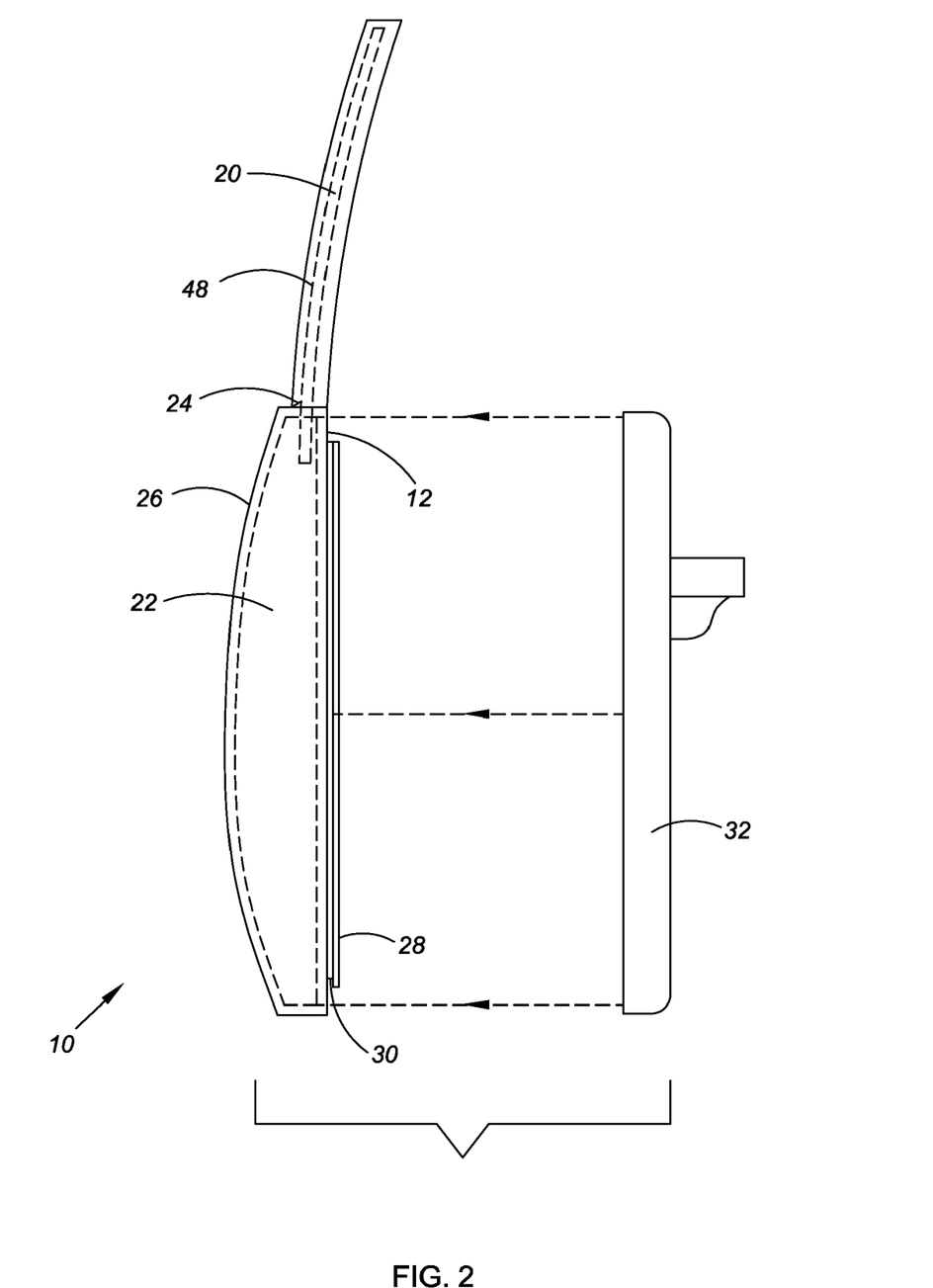
FIG. 2 illustrates a rear edge exploded view of the vehicle door of FIG. 1A illustrating the water deflector sheet secured to the inner door panel by the adhesive sealing material as well as the door interior trim panel positioned for installation onto the inner door panel of the vehicle door for decoratively covering the inner door panel and water deflector sheet.

The discussion is now directed to FIGS. 1A and 2. FIG. 1A illustrates a front view of the interior side of a vehicle door 10 showing the inner door panel 12. FIG. 2 illustrates the rear edge view of the vehicle door 10 of FIG. 1A illustrating the water deflector sheet 28 secured to the inner door panel 12 by the adhesive sealing material 30 as well as the door interior decorative trim panel 32 shown spaced apart from the vehicle door 10 and positioned for installation onto the inner door panel 12 for decoratively covering the inner door panel 12 and water deflector sheet 28.

Positioned above the inner door panel 12 is a transparent member, typically a tempered or laminated window 20 that is typically retractably secured into a track in the upper portion of the vehicle door 10 permitting the window 20 to be selectively extended from or selectively retracted into the door cavity 22 (see FIG. 2). The inner door panel 12 has several openings or perforations 14 extending through the inner door panel 12 and opening into the door cavity 22 (see FIG. 2) in the vehicle door 10. These openings or perforations 14 are generally provided in the inner door panel 12 to provide access for the door lock mechanisms, window operating mechanisms, remote control side view mirror operating mechanisms, as well as accessories such as electric window control and door lock switches, speakers for sound systems and various other accessories and mechanisms as may be planned for or provided on certain production configurations of the vehicle.

Under various circumstances water may enter or seep into the door cavity 22 of the vehicle door 10. For discussion purposes one exemplary way that water may enter the door cavity 10 is through the interface between the exterior surface 48 of the window 20 and the window seal strip 24 (see FIG. 2). The window seal strip 24 is configured to sealably bridge the opening between the exterior surface 48 of the window 20 and the exterior door panel 26 of the vehicle door 10. The seal provided by the seal strip 24 is not perfect and the quality of the seal is subject to deterioration over time due to weather and UV aging of the window seal strip 24 material. Water may therefore enter the door cavity 22 through the interface between the window seal strip 24 and the exterior surface 48 of the window 20. It is highly desirable to prevent water that enters the door cavity 22 from entering the interior of the vehicle. The openings 14 in the door inner panel 12 may be problematic in that regard. Therefore, it is highly desirable to provide a water deflection member such as a water deflector sheet 28 (shown in FIG. 1C) to cover the openings 14 in the inner door panel 12 and redirect water potentially passing through the openings 14 in the inner panel 12 back into the door cavity 22, preventing the water from entering the vehicle interior. In accordance with the present invention and as shown in FIG. 1A, a water management trough 16 is formed into the inner door panel 12. The water management trough 16 is at least on the inner door panel 12 along the portion of the inner door panel 12 covered by the bottom edge 54 of the water deflector sheet 28 (see FIG. 1B). The water management trough 16 often further extends at least partially up opposing sides 52 of the area covered by water deflector sheet 28 so that the water management trough 16 is sufficiently outboard of the perforations or openings 14 of the inner door panel 12 to collect water passing therethrough. Water drain holes 18 are provided in low points in the water management trough 16. The water drain holes 18 extend through the inner door panel 12 permitting water channeled or routed in the water management trough 16 to drain into the door cavity 22 of the vehicle door 10. The water management trough 16 is discussed in further detail below. The water management trough 16 has an inboard boundary or first boundary 34 and a distally spaced outboard boundary or second boundary 36 that defines the wall extent of the water management trough 16. The inboard boundary 34 and outboard boundary 36 are more clearly shown in FIG. 4 discussed later below. Regarding FIG. 1A, it is to be understood that the illustrated arrangement of the water management trough 16, the quantity and location of water drain holes 18 and the number of openings 14 in the inner door panel 12 are variable and were chosen to illustrate one embodiment of many possible embodiments of the invention disclosed herein. It is intended that the disclosed invention is in no way limited to the exemplary arrangement illustrated in FIG. 1A but instead encompass any number and configuration of water management troughs 16 sufficiently outboard of or encircling any number of perforations or openings 14 in the inner door panel 12 with a sufficient number of water drain holes 18 located and provided in the water management trough 16 to effectively drain the collected water from the water management trough 16 as deemed advantageous for any particular configuration of vehicle door 10.

Figure 1B:
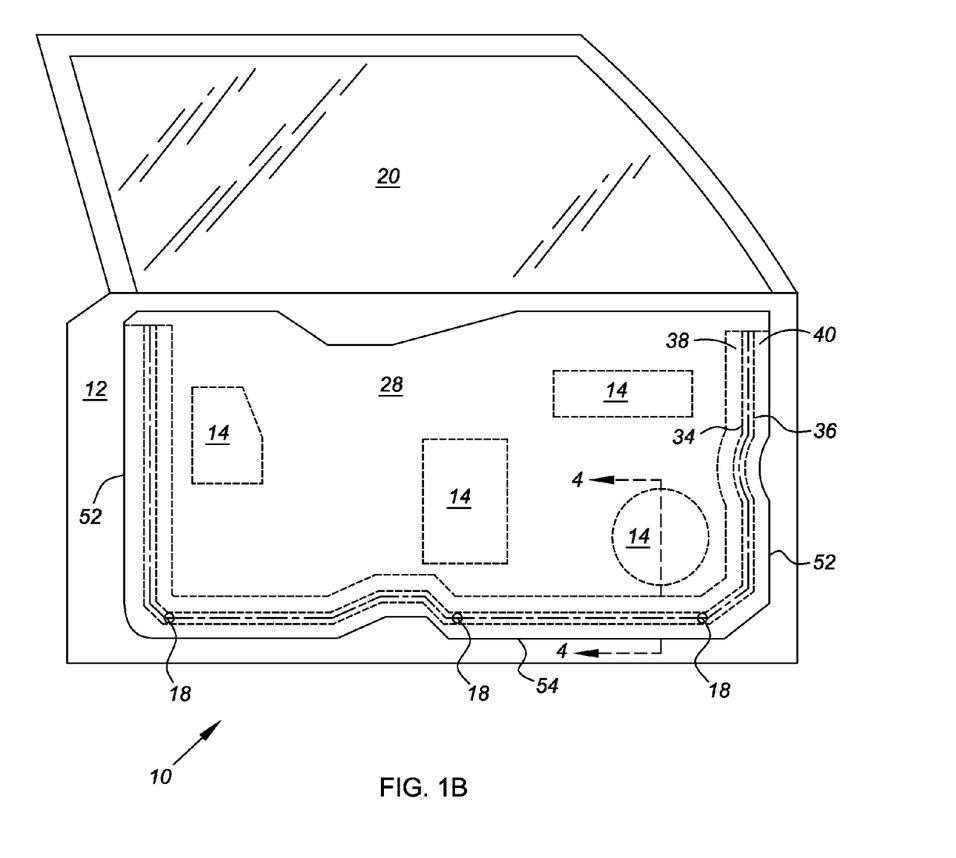
FIG. 1B illustrates a front view of the interior side of a vehicle door of FIG. 1A showing the inner door panel with several openings through the inner panel, the water management trough formed into the inner door panel, the primary sealing zone, the secondary sealing zone and a water deflector sheet secured to the inner door panel consistent with the present invention.
Figure 1C:
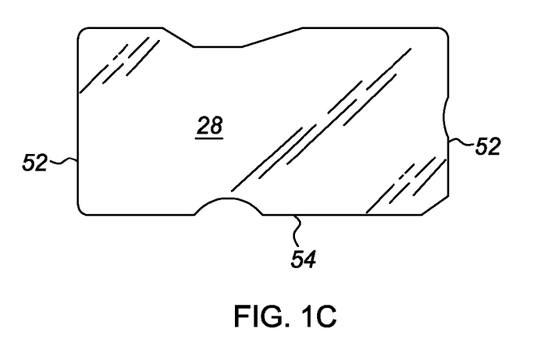
FIG. 1C illustrates a plan view of an exemplary water deflector sheet consistent with the present invention.

The discussion is now directed to FIGS. 1B, 1C and 2. FIG. 1B illustrates the front view of the interior side of a vehicle door of FIG. 1A showing the inner door panel 12 with several openings 14 extending through the inner panel 12 into the door cavity 22 (see FIG. 2). FIG. 1C illustrates an exemplary water deflector sheet 28 consistent with the present invention. In FIG. 1B the primary sealing zone 38 consists of a first strip of adhesive material positioned proximate to the inboard boundary or first boundary 34 of the water management trough 16 and extending along the length of the water management trough 16. The secondary sealing zone 40 consists of a second strip of adhesive material positioned proximate to the outside of the outboard boundary 36 of the water management trough 16 and extending along the length of the water management trough 16. In a preferred embodiment, the primary sealing zone 38 has a width of approximately 10 to 12 mm and the secondary sealing zone 40 has a width of 25 mm. A water deflector sheet 28 (shown individually in FIG. 1C and shown secured to the inner panel 12 in FIGS. 1C and 1B) consisting of a sheet of water shedding or water impervious material such as plastic or "poly" is sized and configured to overlay and cover the water management trough 16 (FIG. 1B) and the primary or initial sealing zone 38 and secondary or outboard sealing zone 40 as well as the perforations or openings 14 in the inner door panel 12, whereby to sufficiently encircle the openings 14 by the water management trough 16 to collect the water which may have seeped into the door. As shown in FIG. 1B, the water management trough 16 includes one or more water drain holes 18 in low points along the water management trough 16. The water deflector sheet 28 is adhesively secured to the inner door panel 12 by adhesive strips in the primary sealing zone 38 and secondary sealing zone 40. The water deflector sheet 28 is adhesively sealed over and covers the water management trough 16 forming a conduit for routing water along the periphery edges of the water deflector sheet 28 such that water seeping into the conduit through the primary sealing zone 38 is routed along the water management trough 16 to the drain holes 18. The drain holes 18 drain the water seepage into the door cavity 22 and thereby prevent water seepage from entering the vehicle interior. As water drain holes 18 are positioned at low points along the water management trough 16, water is thereby prevented from retentively accumulating in the water management trough 16. Water may enter the water management trough 16 through gaps which may have opened in the primary sealing zone 38, the water reaching the primary sealing zone 38 from drips, runoff, splash or other water ingress through the openings 14 in the inner door panel 12 as discussed earlier above.

The water management trough 16 and secondary sealing zone 40 illustrated in FIG. 1B improve door water management over the prior art.

Figure 3:
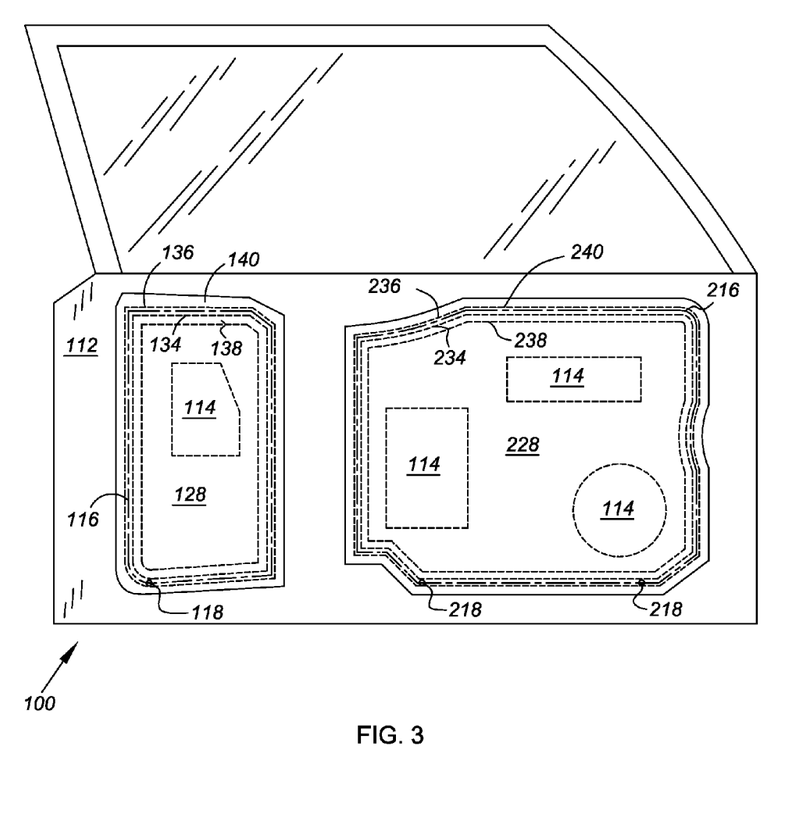
FIG. 3 illustrates a front view of the interior side of another embodiment of a vehicle inner door panel having two water management troughs encircling one or more openings through the inner door panel and showing two water management sheets secured to the inner door panel consistent with the present invention.

FIG. 3 illustrates the front view of the interior side of another embodiment of a vehicle door 100 having two water management troughs 116 and 216, each encircling about one or more openings 114 through the inner door panel 112 and illustrating two water deflector sheets 128 and 228 secured to the inner door panel 112 consistent with the present invention. As discussed above, embodiments of the present invention may have any number of water deflector sheets (128 and 228) and water management troughs (116 and 216) on a given vehicle door inner panel 112. Water management trough 116 is shown with one water drain hole 118 located at a low point along the water management trough 116. Similarly, water management trough 216 is shown with two water drain holes 218 located at low points along the water management trough 216. Similar to earlier discussions of FIG. 1B, in FIG. 3 the primary sealing zone 138 and 238 consists of a first strip of adhesive material positioned proximate to the inboard boundary or first boundary 134 and 234 of the water management trough 116 and 216 and extending along the length of the water management trough 116 and 216. The secondary sealing zone 140 and 240 consists of a second strip of adhesive material positioned proximate to the outboard boundary or second boundary 136 and 236 of the water management trough 116 and 216 and extending along the length of the water management trough 116 and 216. Water deflector sheets 128 and 228 consist of a sheet of water shedding or water impervious material such as plastic or "poly" are sized and configured to overlay and cover the water management troughs 116 and 216 and the primary sealing zone 138 and 238 and secondary sealing zone 140 and 240 as well as the openings 114 in the inner door panel 112 encircled by the water management troughs 116 and 216.

Figure 4:
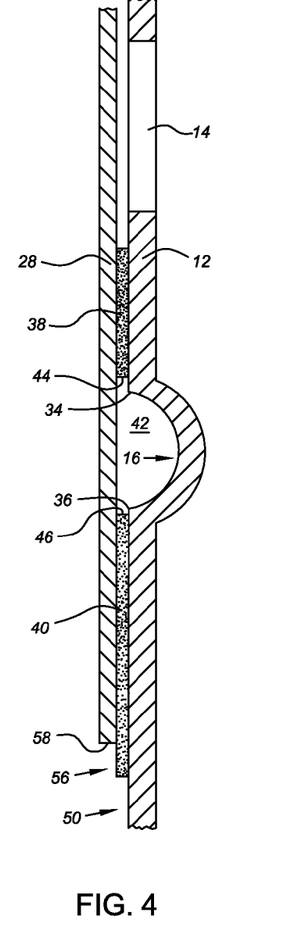
FIG. 4 illustrates a cross section of the region '4' shown on FIG. 1B depicting a zoom view cross section of the water management trough formed into the inner door panel and illustrating the primary and secondary sealing zones with the adhesive attaching the water deflector sheet to the inner door panel.

FIG. 4 illustrates a cross section of the region '4' shown on FIG. 1B depicting a zoom or enlarged view cross section of the water management trough 16 formed into the inner door panel 12 and illustrating the primary sealing zone 38 which initially receives water which has seeped into the door and secondary sealing zone 40 adhesively attaching the water deflector sheet 28 to the interior facing surface 50 of the inner door panel 12 so that water initially received will be collected in trough 16. The void forming the water conduit 42 has walls defined by the water management trough 16 and the inwardly facing edge 44 of the primary seal zone 38, the inwardly facing edge 46 of the secondary seal zone 40 and the adhesively secured water deflector sheet 28. The water management trough 16 has an inboard boundary or first boundary 34 and a distally spaced outboard boundary or second boundary 36 that defines the wall extent of the water management trough 16. In some embodiments, the secondary sealing zone 40 has a portion 56 that extends beyond the outer edge 58 of the water deflector sheet 28, the width of the secondary zone being extended to allow for misalignment of the water deflector sheet 28 during installation onto the inner door panel 12.

Figure 5:
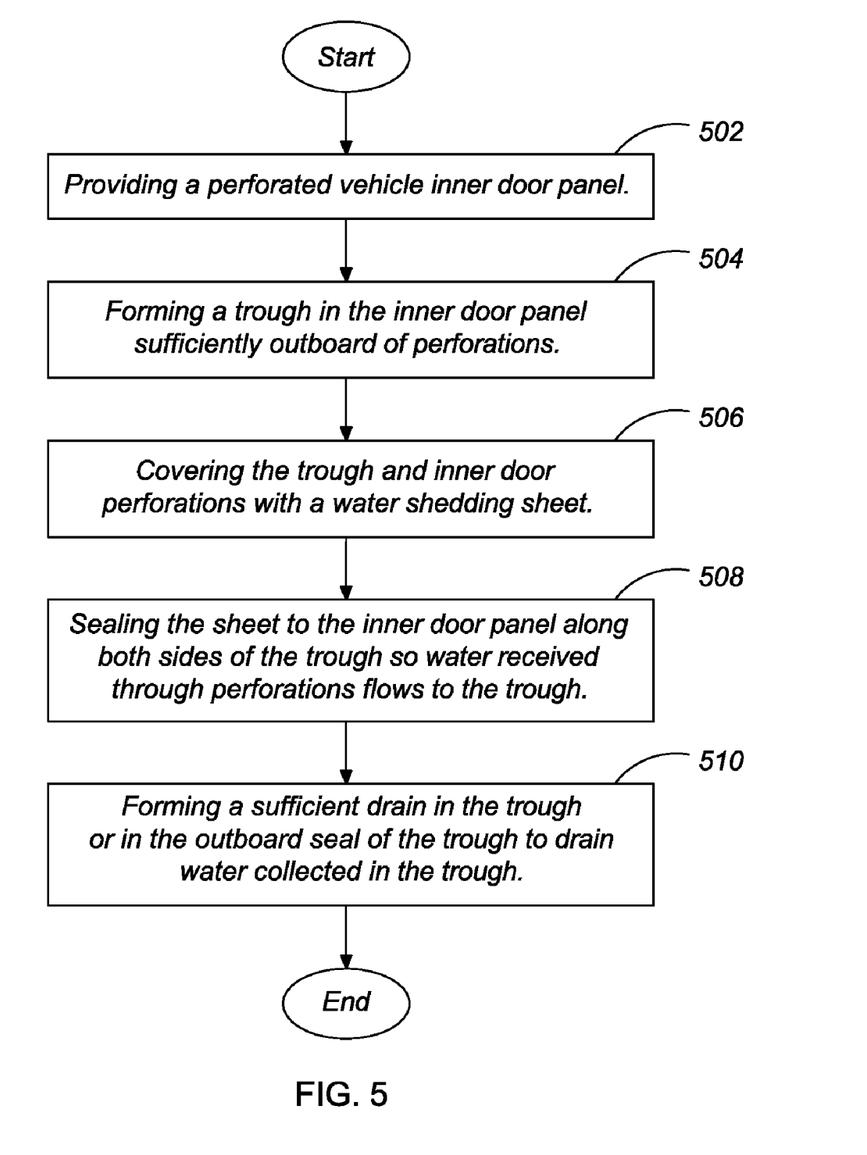
FIG. 5 presents a flow diagram of a method of passively managing water seeping into a vehicle door having a perforated inner door panel.

FIG. 5 presents a method of passively managing water seeping into a vehicle door having a perforated inner door panel. The method begins at block 502 by providing a perforated inner door panel for a vehicle door. Then at block 504 a trough is formed in the inner door panel at a location sufficiently outboard of the perforation or perforations to receive water seeping through the door perforations. At block 506 a water shedding sheet is provided and positioned on the inner door panel to cover the trough and perforations in the inner door panel. Then at block 508 the water shedding sheet is sealed to the inner door panel along both sides, i.e.: the inboard (or first) side and the outboard (or second) side of the trough so that water flowing towards the trough will be collected in the trough. The inboard side of the trough is the side nearest to the perforations. At block 510 a sufficient drain is formed in one of the trough or the seal on the outboard side of the trough so that water collected in the trough will drain.

While the best modes for carrying out the invention have been described in detail, those familiar with the art to which this invention relates will recognize various alternative designs and embodiments for practicing the invention within the scope of the appended claims.

The invention claimed is:

1. A passive water management system for water seeping into a vehicle door, comprising:
    at least one water management trough formed into a portion of said vehicle door to receive said water, said water management trough configured to route water away from an interior of a vehicle;
    at least one primary sealing zone having a first strip of adhesive material bordering a first boundary of said water management trough for initially receiving said water, said first strip secured to said vehicle door;
    at least one secondary sealing zone having a second strip of adhesive material bordering a second boundary of said water management trough for collecting said water received in said trough, said second strip secured to said vehicle door; and
    a sheet of water shedding material covering at least a portion of said water management trough, said water shedding material secured to said vehicle door by said first and second strips of adhesive material.

2. The passive water management system according to claim 1, wherein said water management trough is formed into a portion of an inner door panel of said vehicle door.

3. The passive water management system according to claim 1, wherein
    said at least one water management trough is formed into an inner door panel of said vehicle door, said water management trough having a first boundary and a second boundary, said inner door panel having one or more openings therethrough, said passive management water system further comprising:
    at least one primary sealing zone having a first strip of adhesive sealing material secured to said inner door panel for initially receiving said water, said water management trough having a primary sealing zone bordering said first boundary of said water management trough;
    at least one secondary sealing zone having a second strip of adhesive sealing material secured to said inner door panel for holding said water received in said trough, said water management trough having a secondary sealing zone bordering said second boundary of said water management trough for holding said water received in said trough; and
    at least one water deflector sheet, said water deflector sheet sized and configured to overlay and substantially cover said water management trough, a portion of said primary sealing zone and a portion of said secondary sealing zone, said water deflector sheet adhesively secured to said inner door panel and sealably covering said water management trough;
    wherein water seeping through said primary sealing zone covered by said water deflector sheet is sufficiently routed by said water management trough to prevent said water seepage from entering an interior portion of said vehicle.

4. The passive water management system according to claim 3, wherein said water management trough extends in said inner door panel along a portion of said inner door panel covered by a bottom edge of said water deflector sheet and at least partially up opposing sides covered by said water deflector sheet.

5. The passive water management system according to claim 4, wherein said water management trough continues up said opposing sides covered by said water deflector sheet and extends at least partially across a top portion of said inner door panel covered by said water deflector sheet.

6. The passive water management system according to claim 3, wherein said water deflector sheet includes a material selected from the group consisting of: polyethylene, polypropylene, filled polyethylene and modified polypropylene.

7. The passive water management system according to claim 3, wherein said adhesive material strips in said primary sealing zone and in said secondary sealing zone are applied together as a bead to said inner door panel.

8. The passive water management system according to claim 3, wherein said secondary sealing zone has a width extending beyond an area on said inner door panel covered by said water deflector sheet, said width extended sufficiently to allow for misalignment of said water deflector sheet during application onto said inner door panel.

9. A passive water management system for a vehicle door having a door cavity comprising:
    an inner door panel having a one or more openings therethrough, at least a portion of said one or more openings belonging to a first subset of openings;
    a first water management trough formed into a surface of said inner door panel, said first water management trough having a first boundary and a second boundary on said surface, said first water management trough having at least one drain hole positioned along said first water management trough for draining water from said first water management trough into said door cavity, wherein said first boundary is an inboard boundary of said first water management trough relative to said first subset of openings;
    a primary sealing zone having a first strip of adhesive sealing material secured to said surface of said inner door panel, said first water management trough having said primary sealing zone positioned proximate to and extending along said first boundary of said first water management trough;
    a secondary sealing zone having a second strip of adhesive sealing material secured to said surface of said inner door panel, said first water management trough having said secondary sealing zone positioned proximate to and extending along said second boundary of said first water management trough;
    a first water deflector sized and configured to overlay and cover at least a portion of said first water management trough including a portion of said primary sealing zone and a portion of said secondary sealing zone, said water deflector adhesively secured to said inner door panel surface and sealably covering at least a portion of said first water management trough;

wherein said first water deflector adhesively sealed over and covering said first water management trough forms a conduit for routing water;

wherein water seeping into said first water management trough through said primary sealing zone is routed along said first water management trough to said at least one drain hole, said at least one drain hole draining said water seepage into said door cavity thereby preventing water seepage from entering a vehicle interior.

10. The passive water management system according to claim 9, wherein said water deflector is a flexible sheet of water shedding material.

11. The passive water management system according to claim 9, wherein said first water management trough is formed into at least a portion of a vehicle interior facing surface of said inner door panel.

12. The passive water management system according to claim 11, wherein said at least one drain hole is formed at a low point along said first water management trough such as to minimize water retention in said first water management trough.

13. The passive water management system according to claim 12, wherein said vehicle door is a motor vehicle occupant compartment door.

14. The passive water management system according to claim 9, wherein said first water management trough extends in said inner door panel along a portion of said inner door panel covered by a bottom edge of said water deflector and extends at least partially up opposing sides covered by said water deflector in said inner door panel.

15. The passive water management system according to claim 14, wherein said first water management trough continues up said opposing sides covered by said water deflector and extends at least partially across a portion of said inner door panel covered by a top portion of said water deflector.

16. The passive water management system according to claim 13, wherein said adhesive sealing material in said primary sealing zone and in said secondary sealing zone are applied together as single beads to said inner door panel.

17. The passive water management system according to claim 13, wherein said adhesive material in said primary sealing zone is applied to said inner door panel separately from said adhesive material in said secondary sealing zone.

18. The passive water management system according to claim 9, wherein said first water management trough fully encircles said first subset of openings.

19. The passive water management system according to claim 9, further comprising:
a second subset of openings selected from said one or more openings in said inner door panel, wherein openings in said second subset are not members of said first subset;
a second water management trough formed into said surface of said inner door panel, said second water management trough having a first boundary and a second boundary, said second water management trough configured to at least partially encircle said second subset of openings, said second water management trough having at least one drain hole positioned along said second water management trough for draining water from said second water management trough into said door cavity;
a third sealing zone having a third strip of adhesive sealing material secured to said surface of said inner door panel, said third sealing zone positioned proximate to and extending along said first boundary of said second water management trough;
a fourth sealing zone having a fourth strip of adhesive sealing material secured to said surface of said inner door panel, said fourth sealing zone positioned proximate to and extending along said second boundary of said second water management trough, wherein said second water management trough together with said third and fourth sealing zones of said second water management trough are sized to at least partially encircle outboard extents of said second subset of openings;
a second water deflector sized to extend over and cover said second subset of openings together with said second water management trough, said second water deflector secured to said inner door panel by said third and fourth sealing zones of said second water management trough;
wherein said second water deflector secured to said second water management trough forms a conduit for routing water to said inner door panel through said drain hole in said second water management trough.

20. A method of passively managing water seeping into a vehicle door having an inner door panel with perforations, comprising:
forming a trough into said inner door panel sufficiently outboard of and at least partially encircling said perforations to receive said water, said trough having a first side and a second side, wherein said first side is the side of said trough nearest to said perforations;
covering said trough and said perforations of said inner door panel with a water shedding sheet;
sealing said sheet to said inner door panel along both said first side and said second side of said trough in a manner to sufficiently seal said first side of said trough so that water received through said perforations will flow toward said trough and to sufficiently seal said second side of said trough so that water flowing toward said trough will be collected in said trough; and
forming a sufficient drain in one of said trough or said seal on said second side of said trough so that water collected in said trough will drain.

* * * * *